United States Patent
Tenghamn et al.

(10) Patent No.: US 9,360,574 B2
(45) Date of Patent: Jun. 7, 2016

(54) PISTON-TYPE MARINE VIBRATORS COMPRISING A COMPLIANCE CHAMBER

(71) Applicant: PGS Geophysical AS, Oslo (NO)

(72) Inventors: Stig Rune Lennart Tenghamn, Katy, TX (US); Julie Slaughter Zrostlik, Ames, IA (US); Todd Allan Reinders, Granger, IA (US)

(73) Assignee: PGS Geophysical AS, Oslo (NO)

( * ) Notice: Subject to any disclaimer, the term of this patent is extended or adjusted under 35 U.S.C. 154(b) by 0 days.

(21) Appl. No.: 14/462,052

(22) Filed: Aug. 18, 2014

(65) Prior Publication Data

US 2015/0085606 A1    Mar. 26, 2015

Related U.S. Application Data

(63) Continuation-in-part of application No. 14/284,847, filed on May 22, 2014.

(60) Provisional application No. 61/904,866, filed on Nov. 15, 2013, provisional application No. 61/880,561, filed on Sep. 20, 2013.

(51) Int. Cl.
*G01V 1/145* (2006.01)
*G01V 1/38* (2006.01)
(Continued)

(52) U.S. Cl.
CPC .. *G01V 1/04* (2013.01); *G01V 1/02* (2013.01); *G01V 1/143* (2013.01); *G01V 1/38* (2013.01); *G01V 2210/1293* (2013.01)

(58) Field of Classification Search
CPC ......... G01V 1/04; G01V 1/145; G01V 1/159; G01V 1/38; G01V 2210/1293
USPC ............ 181/110, 111, 113, 120; 367/15, 143, 367/168, 174, 189
See application file for complete search history.

(56) References Cited

U.S. PATENT DOCUMENTS

| 3,370,672 | A | | 2/1968 | Eberlan |
| 3,384,868 | A | * | 5/1968 | Brown ................... G01V 1/135 367/143 |

(Continued)

FOREIGN PATENT DOCUMENTS

| EP | 0835462 B1 | 1/2003 |
| RU | 93052952 A | 2/1995 |

(Continued)

OTHER PUBLICATIONS

Rune Tenghamn, "PGS Electrical Marine Vibrator," Tech Link, Nov. 2005, pp. 1-3, vol. 5, No. 11, Publication of PGS Geophysical.

(Continued)

*Primary Examiner* — Jeremy Luks

(57) ABSTRACT

Disclosed are embodiments of a marine vibrator and methods of using. Embodiments of the marine vibrator may comprise a containment housing; a piston plate, wherein an internal volume of the marine vibrator is at least partially defined by the containment housing and the piston plate, the internal volume containing a first gas at a first gas pressure; a fixture coupled to the containment housing; a mechanical spring element coupled to the piston plate and the fixture; a driver coupled to the piston plate and the fixture, wherein the driver is configured to move the piston plate back and forth; and a compliance chamber in contact with the first gas, wherein the compliance chamber comprises a second gas at a second gas pressure.

25 Claims, 13 Drawing Sheets

(51) Int. Cl.
*G01V 1/04* (2006.01)
*G01V 1/143* (2006.01)
*G01V 1/02* (2006.01)

(56) References Cited

U.S. PATENT DOCUMENTS

| | | | |
|---|---|---|---|
| 4,211,301 A | 7/1980 | Mifsud | |
| 4,483,411 A * | 11/1984 | Mifsud | G01V 1/145 181/120 |
| 4,557,348 A * | 12/1985 | Mifsud | G01V 1/145 181/120 |
| 4,578,784 A | 3/1986 | Mifsud | |
| 5,206,839 A | 4/1993 | Murray | |
| 5,225,731 A | 7/1993 | Owen | |
| 5,646,380 A | 7/1997 | Vaage | |
| 5,757,726 A | 5/1998 | Tenghamn et al. | |
| 5,757,728 A | 5/1998 | Tenghamn et al. | |
| 5,959,939 A | 9/1999 | Tenghamn et al. | |
| 6,009,047 A | 12/1999 | Barger | |
| 6,041,888 A | 3/2000 | Tenghamn | |
| 6,076,629 A | 6/2000 | Tengham | |
| 6,085,862 A | 7/2000 | Tenghamn | |
| 6,556,510 B2 | 4/2003 | Ambs | |
| 6,606,958 B1 | 8/2003 | Bouyoucos | |
| 6,624,539 B1 | 9/2003 | Hansen et al. | |
| 6,851,511 B2 | 2/2005 | Tenghamn | |
| 6,901,028 B2 | 5/2005 | Clayton et al. | |
| 7,142,481 B1 | 11/2006 | Metzbower et al. | |
| 7,468,932 B2 | 12/2008 | Tenghamn | |
| 7,539,079 B2 | 5/2009 | Hoogeveen et al. | |
| 7,551,518 B1 | 6/2009 | Tenghamn | |
| 7,881,158 B2 | 2/2011 | Tenghamn | |
| 7,926,614 B2 | 4/2011 | Tenghamn et al. | |
| 7,929,380 B2 | 4/2011 | Wei et al. | |
| 7,957,220 B2 | 6/2011 | Howlid et al. | |
| 7,974,152 B2 | 7/2011 | Tenghamn | |
| 8,050,139 B2 | 11/2011 | Berstad | |
| 8,050,867 B2 | 11/2011 | Johnson et al. | |
| 8,061,471 B2 | 11/2011 | Wei | |
| 8,079,440 B2 | 12/2011 | Laycock | |
| 8,081,540 B2 | 12/2011 | Ross | |
| 8,094,514 B2 | 1/2012 | Tenghamn | |
| 8,098,542 B2 | 1/2012 | Hillesund et al. | |
| 8,102,731 B2 | 1/2012 | Cambois | |
| 8,154,176 B2 | 4/2012 | Karakaya et al. | |
| 8,167,082 B2 | 5/2012 | Eick et al. | |
| 8,174,927 B2 | 5/2012 | Hopperstad et al. | |
| 8,189,426 B2 | 5/2012 | West et al. | |
| 8,205,711 B2 | 6/2012 | Hopperstad et al. | |
| 8,261,875 B2 | 9/2012 | Eick et al. | |
| 8,331,198 B2 | 12/2012 | Morozov et al. | |
| 8,335,127 B2 | 12/2012 | Tenghamn | |
| 8,342,288 B2 | 1/2013 | Eick et al. | |
| 8,400,872 B2 | 3/2013 | Gulgne et al. | |
| 8,427,901 B2 | 4/2013 | Lunde et al. | |
| 8,441,892 B2 | 5/2013 | Morozov et al. | |
| 8,446,798 B2 | 5/2013 | Tenghamn | |
| 8,582,395 B2 | 11/2013 | Ferber | |
| 8,630,149 B2 | 1/2014 | Thompson et al. | |
| 8,634,276 B2 | 1/2014 | Morozov et al. | |
| 8,662,243 B2 | 3/2014 | Eick et al. | |
| 8,670,292 B2 | 3/2014 | Engdahl | |
| 2006/0193203 A1 | 8/2006 | Tenghamn et al. | |
| 2008/0253226 A1 | 10/2008 | Tenghamn et al. | |
| 2009/0147626 A1 | 6/2009 | Vahida et al. | |
| 2009/0279387 A1 | 11/2009 | Tenghamn et al. | |
| 2010/0118647 A1 | 5/2010 | Tenghamn | |
| 2011/0069741 A1 | 3/2011 | Erickson | |
| 2011/0090759 A1 | 4/2011 | Laycock | |
| 2011/0297476 A1 | 12/2011 | Harper et al. | |
| 2011/0317515 A1 | 12/2011 | Tenghamn | |
| 2012/0075955 A1 | 3/2012 | Dean | |
| 2012/0081997 A1 | 4/2012 | Babour et al. | |
| 2012/0147699 A1 | 6/2012 | Dellinger et al. | |
| 2012/0147709 A1 | 6/2012 | Zowarka, Jr. et al. | |
| 2012/0155217 A1 | 6/2012 | Dellinger et al. | |
| 2012/0188845 A1 | 7/2012 | Jeffryes | |
| 2012/0232780 A1 | 9/2012 | Delson et al. | |
| 2012/0314536 A1 | 12/2012 | Bagaini | |
| 2013/0037342 A1 | 2/2013 | Engdahl | |
| 2014/0238773 A1* | 8/2014 | Sallas et al. | G01V 1/04 181/121 |
| 2014/0334254 A1 | 11/2014 | Zrostlik et al. | |
| 2014/0334259 A1 | 11/2014 | Tenghamn | |
| 2014/0340985 A1 | 11/2014 | Tenghamn | |
| 2015/0085605 A1 | 3/2015 | Tenghamn | |
| 2015/0085607 A1 | 3/2015 | Tenghamn | |
| 2015/0085608 A1 | 3/2015 | Tenghamn et al. | |
| 2015/0234072 A1* | 8/2015 | McConnell | G01V 1/159 367/156 |

FOREIGN PATENT DOCUMENTS

| | | |
|---|---|---|
| RU | 2159945 C1 | 11/1999 |
| WO | 9530912 A1 | 11/1995 |
| WO | 9701770 A1 | 1/1997 |
| WO | 0071266 A1 | 11/2000 |

OTHER PUBLICATIONS

Rune Tenghamn and Andrew Long, PGS shows off electrical marine vibrator to capture 'alternative' seismic source market, First Break, Jan. 2006, pp. 11-14, vol. 24.

Rune Tenghman, "Complementing Seismic Source Technology with Marine Vibrators," Presented at PGS Technology day in Oslo, Norway, Oct. 16, 2012.

Feng et al., "A Class IV Flextensional Device Based on Electrostrictive Poly(vinylidene fluoride-trifluoroethylene Copolymer," Jun. 2003, pp. 1-6.

Ralph S. Woollett, "Underwater Helmholtz-Resonator Transducers: General Design Principles," NUSC Technical Report 5633, Jul. 5, 1977, pp. 1-48.

Rolex Spring Catalog, MW Industries, Inc., 2009.

Fons Ten Kroode et al., "Broadband seismic data—The importance of low frequencies," Geophysics, Mar.-Apr. 2013, pp. WA3-WA14, vol. 78, No. 2.

Ralph S. Woollett, "Current Approaches to the Miniaturization and Pressure Release Problems of VLF Transducers," Naval Underwater Systems Center, Nov. 5, 1973.

European Search report mailed Sep. 14, 2015, in the prosecution of patent application No. 14183242.8, 7 pages.

* cited by examiner

PISTON-TYPE MARINE VIBRATORS COMPRISING A COMPLIANCE CHAMBER

CROSS-REFERENCE TO RELATED APPLICATIONS

The present application claims priority to U.S. Provisional Application No. 61/904,866, filed on Nov. 15, 2013, and to U.S. Nonprovisional application Ser. No. 14/284,847, filed on May 22, 2014, which claims priority to U.S. Provisional Application No. 61/880,561, filed on Sep. 20, 2013, the entire disclosures of which are incorporated herein by reference.

BACKGROUND

Embodiments relate generally to piston-type marine vibrators for marine geophysical surveys. More particularly, embodiments relate to the use of compliance chambers in piston-type marine vibrators to compensate for air-spring effects.

Sound sources are generally devices that generate acoustic energy. One use of sound sources is in marine seismic surveying in which the sound sources may be employed to generate acoustic energy that travels downwardly through water and into subsurface rock. After interacting with the subsurface rock, for example, at boundaries between different subsurface layers, some of the acoustic energy may be reflected back toward the water surface and detected by specialized sensors, in the water, typically either on the water bottom or towed on one or more streamers. The detected energy may be used to infer certain properties of the subsurface rock, such as structure, mineral composition and fluid content, thereby providing information useful in the recovery of hydrocarbons.

Most of the sound sources employed today in marine seismic surveying are of the impulsive type, in which efforts are made to generate as much energy as possible during as short a time span as possible. The most commonly used of these impulsive-type sources are air guns that typically utilize compressed air to generate a sound wave. Other examples of impulsive-type sources include explosives and weight-drop impulse sources. Another type of sound source that can be used in marine seismic surveying includes marine vibrators, such as hydraulically powered sources, electro-mechanical vibrators, electrical marine seismic vibrators, and sources employing piezoelectric or magnetostrictive material. Marine vibrators typically generate vibrations through a range of frequencies in a pattern known as a "sweep" or "chirp."

Prior sound sources for use in marine seismic surveying have typically been designed for relatively high-frequency operation (e.g., above 10 Hz). However, it is well known that as sound waves travel through water and through subsurface geological structures, higher frequency sound waves may be attenuated more rapidly than lower frequency sound waves, and consequently, lower frequency sound waves can be transmitted over longer distances through water and geological structures than can higher frequency sound waves. Thus, efforts have been undertaken to develop sound sources that can operate at lower frequencies. Very low frequency sources ("VLFS") have been developed that typically have at least one resonance frequency of about 10 Hz or lower. VLFS's are typically characterized by having a source size that is very small as compared to a wavelength of sound for the VLFS. The source size for a VLFS is typically much less than $1/10^{th}$ of a wavelength and more typically on the order of $1/100^{th}$ of a wavelength. For example, a source with a maximum dimension of 3 meters operating at 5 Hz is $1/100^{th}$ of a wavelength in size.

In order to achieve a given level of output in the water, a marine vibrator typically needs to undergo a change in volume. In order to work at depth while minimizing structural weight, the marine vibrator may be pressure balanced with external hydrostatic pressure. As the internal gas (e.g., air) in the marine vibrator increases in pressure, the bulk modulus (or "stiffness") of the internal gas also rises. Increasing the bulk modulus of the internal gas also increases the air-spring effect within the marine vibrator. As used herein, the term "air spring" is defined as an enclosed volume of air that may absorb shock or fluctuations of load due to the ability of the enclosed volume of air to resist compression and decompression. Increasing the stiffness of the air in the enclosed volume increases the air-spring effect and thus the ability of the enclosed volume of air to resist compression and decompression. This increase in the air-spring effect of the internal gas tends to be a function of the operating depth of the source. Further, the stiffness of the acoustic components of the marine vibrator and the internal gas are the primary determining factors in the marine vibrator's resonance frequency. Accordingly, the resonance frequency generated by the marine vibrator may undesirably increase when the marine vibrator is towed at depth, especially in marine vibrators where the interior volume of the marine vibrator may be pressure balanced with the external hydrostatic pressure.

BRIEF DESCRIPTION OF THE DRAWINGS

These drawings illustrate certain aspects of some of the embodiments of the present invention and should not be used to limit or define the invention.

DETAILED DESCRIPTION

It is to be understood that the present disclosure is not limited to particular devices or methods, which may, of course, vary. It is also to be understood that the terminology used herein is for the purpose of describing particular embodiments only, and is not intended to be limiting. All numbers and ranges disclosed herein may vary by some amount. Whenever a numerical range with a lower limit and an upper limit is disclosed, any number and any included range falling within the range are specifically disclosed. Although individual embodiments are discussed, the invention covers all combinations of all those embodiments. As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected. If there is any conflict in the usages of a word or term in this specification and one or more patent or other documents that may be incorporated herein by reference, the definitions that are consistent with this specification should be adopted for the purposes of understanding this invention.

Embodiments relate generally to marine vibrators for marine geophysical surveys that incorporate one or more piston plates that may act on the surrounding water to produce acoustic energy. More particularly, embodiments relate to use of compliance chambers in piston-type marine vibrators to compensate for volume changes of the internal gas to the marine vibrators during operation. As discussed in more detail below, the compliance chamber may shift the resonance frequency of the marine vibrator lower and may also increase the sound output at lower frequencies. Advantageously, the marine vibrators may display a low resonance frequency in the seismic frequency range of interest. In particular embodiments, the marine vibrators may display a first resonance frequency within the seismic frequency range of about 1 Hz to about 10 Hz when submerged in water at a depth of from about 0 meters to about 300 meters.

Figure 1:
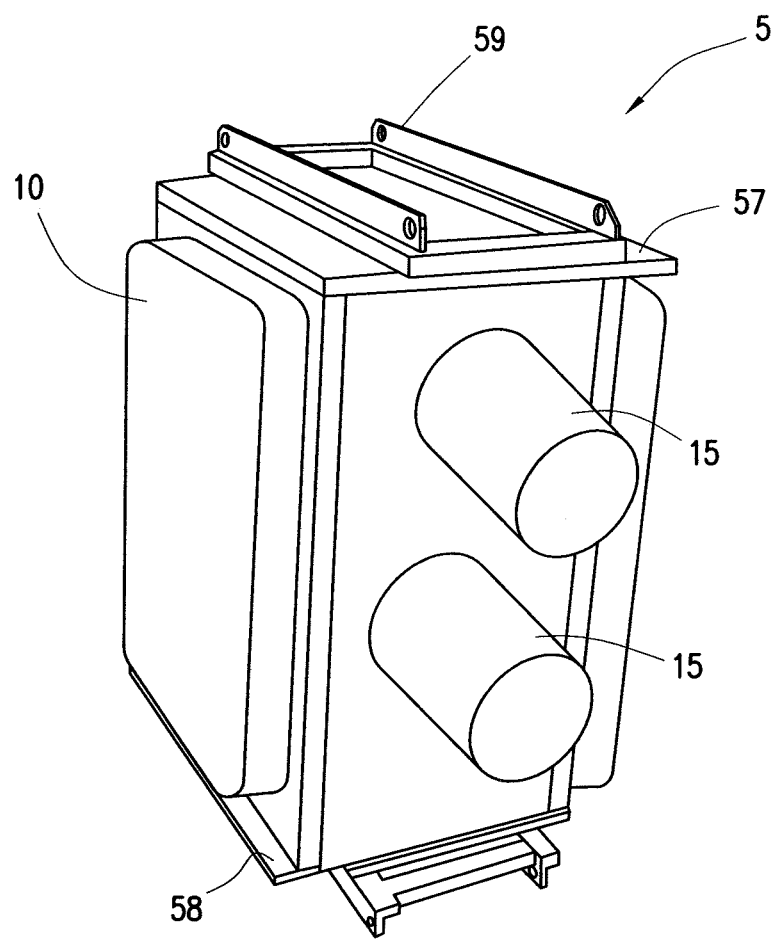
FIG. 1 illustrates an example embodiment of a marine vibrator comprising a compliance chamber.

Piston-type marine vibrators, which may include an actuator and a spring, act as mechanical transformers, which transform the displacement and force generated in the active element to meet the demands of different applications. Piston-type marine vibrators are generally marine vibrators having a piston plate that vibrates to generate acoustic energy. FIG. 1 is an example embodiment of a piston-type marine vibrator, illustrated as marine vibrator 5. As illustrated, marine vibrator 5 may comprise outer piston plates 10 and compliance chamber 15. In the illustrated embodiment, compliance chamber 15 is disposed on the exterior of marine vibrator 5. In alternative embodiments, compliance chamber 15 may be disposed on the interior of marine vibrator 5. In embodiments, marine vibrator 5 may have an internal gas pressure. By way of example, marine vibrator 5 may define an internal volume in which a gas may be disposed. The internal volume of marine vibrator 5 will be referred to herein as the "marine vibrator internal volume." In some embodiments, marine vibrator 5 may have a pressure compensation system. The pressure compensation system may be used, for example, to equalize the internal gas pressure of marine vibrator 5 with the external pressure. The internal gas pressure of marine vibrator 5 will be referred to herein as the "marine vibrator internal gas pressure." Pressure compensation may be used, for example, where marine vibrator 5 needs to be towed at depth to achieve a given level of output. As the depth of marine vibrator 5 increases, the marine vibrator internal gas pressure may be increased to equalize pressure with the increasing external pressure. A gas (e.g., air) may be introduced into marine vibrator 5, for example, to increase the marine vibrator internal gas pressure.

Without being limited by theory, increasing the marine vibrator internal gas pressure may create an air-spring effect that undesirably impacts the resonance frequency of marine vibrator 5. In particular, the resonance frequency may increase as the marine vibrator internal gas pressure increases. Those of ordinary skill in the art, with the benefit of this disclosure, should appreciate that an increase in the marine vibrator internal gas pressure may also result in an increase of the bulk modulus or air-spring effect of the gas (e.g., air) in the marine vibrator 5. Among other things, the resonance frequency of marine vibrator 5 is based on the combination of the air spring of the gas in marine vibrator 5 and the spring constant of the mechanical spring (e.g., mechanical spring elements 65 on FIG. 5). Thus, increasing the bulk modulus or air-spring effect of the internal gas of marine vibrator 5 may also result in an increase in the resonance frequency. As such, the resonance frequency of a marine vibrator 5 towed at depth may undesirably increase when the marine vibrator internal gas pressure is compensated by equalization with the external pressure (e.g., by using a pressure compensation system).

To compensate for changes in the marine vibrator internal gas pressure, compliance chamber 15 may be employed. In accordance with present embodiments, compliance chamber 15 may contain a gas (e.g., air or another suitable gas) with an internal gas pressure equal to or lower than the marine vibrator internal gas pressure. Additional examples of suitable gases used in compliance chamber 15 may include inert gases having a low bulk modulus (e.g., lower bulk modulus than air). The internal gas pressure of compliance chamber 15 will be referred to herein as the "chamber internal gas pressure." In example embodiments, the chamber internal gas pressure may be less than 1 atmosphere. In some embodiments, the chamber internal gas pressure is sufficiently low such that a vacuum or essentially a vacuum may be established in compliance chamber 15. In some embodiments, compliance chamber 15 may be pre-compensated. In pre-compensated embodiments, the compliance chamber may be placed into a compressed state with a pre-determined load so that it may only operate when it reaches a certain depth at which the hydrostatic pressure exceeds the load. At that depth and below the compliance chamber will function as described herein. Without limitation, pre-compensation may be useful in embodiments where smaller compliance chambers are desirable. In pre-compensated embodiments, the chamber internal gas pressure is still equal to or lower than the marine vibrator internal gas pressure, and the compliance chamber is not compensated to the extent that its chamber internal gas pressure would exceed that of the marine vibrator internal gas pressure.

In some embodiments, compliance chamber 15 may comprise a sealed volume with a chamber internal gas pressure of less than 1 atmosphere when at the water surface (less than about 1 meter depth). Alternatively, the chamber internal gas pressure may be equal to or greater than atmospheric pressure when at the water surface. In present embodiments, when marine vibrator 5 is at operational depth, the chamber internal gas pressure may be less than the marine vibrator internal gas pressure. In some embodiments, marine vibrator 5 may be operated, for example, at a depth of from about 1 meter to about 300 meters and, more particularly, from about 1 meter to about 100 meters. Embodiments of compliance chamber 15 may comprise a spring-piston assembly in a chamber with the chamber internal gas pressure less than the marine vibrator internal gas pressure. Alternative embodiments of compliance chamber 15 may comprise a spring-piston assembly in a flexible bellows, which may be a flexible mechanical structure with a chamber internal gas pressure less than that of the marine vibrator internal gas pressure, so that the combination of structure and internal gas is more compliant, in other words, the combination is exerts less resistance to an increase in the marine vibrator internal gas pressure. Compliance chamber 15 may be in contact with the marine vibrator internal gas and the chamber internal gas, wherein at least a portion of compliance chamber 15 is exposed to the marine vibrator internal gas and the chamber internal gas. However, the marine vibrator internal gas and the chamber internal gas may not be in contact, and as such are not exposed to one another and do not contact one another. Similarly, the marine vibrator internal volume and compliance chamber internal volume are not in contact, and as such are not exposed to one another and do not contact one another. However, although the marine vibrator internal volume and consequently any marine vibrator internal gas are not in contact with the compliance chamber internal volume and any chamber internal gas, embodiments of the compliance chamber may allow for changes in pressure of the marine vibrator internal gas to effect a change in pressure in the chamber internal gas and vice versa.

In accordance with example embodiments, external energy sources may not be required for operation of compliance chamber 15. Instead, embodiments of compliance chamber 15 may operate due to a change in pressure differential (e.g., across a sealed piston contained in compliance chamber 15) between the marine vibrator internal gas pressure and the chamber internal gas pressure. In some embodiments, the resulting force due to the pressure differential may be counteracted by a force applied to a back side of the piston (e.g., a force applied by a spring, such as a compression spring). The force balance can occur for both static (e.g., pressure caused due to increasing source depth) and dynamic (acoustic operation of the sound source) applications. Increasing the marine vibrator internal gas pressure typically results in an increased force requirement by compliance chamber 15. In embodiments that employ a compression spring, increased force may be achieved through displacement, therefore a volume change may occur within compliance chamber 15 due to changes in the marine vibrator internal gas pressure within marine vibrator 5. Advantageously, changes in the chamber internal volume may compensate changes in the marine vibrator internal volume when of marine vibrator 5 is radiating sound, which may result in a reduction of stiffness effects (i.e., the air-spring effect) of the marine vibrator internal gas on the resonance frequency of marine vibrator 5. Compliance chamber 15 may be appropriately sized to compensate the entire marine vibrator internal volume change of marine vibrator 5, resulting in the same resonance frequency independent of water depth. The stiffness or air-spring effect of the marine vibrator internal gas may be reduced as compliance chamber 15 compensates for any integral gas pressure changes of marine vibrator 5. Combining both these benefits of compliance chamber 15 (e.g., volume compensation and stiffness reduction) may typically result in boosting the low-frequency performance of a marine vibrator 5. Another advantage of compliance chamber 15 may be that it has its own resonance which could increase the acoustic output of marine vibrator 5 and potentially increase the bandwidth.

In some embodiments, marine vibrator 5 may produce at least one resonance frequency between about 1 Hz to about 200 Hz when submerged in water at a depth of from about 0 meters to about 300 meters. In alternative embodiments, marine vibrator 5 may display at least one resonance frequency between about 0.1 Hz and about 100 Hz, alternatively, between about 0.1 Hz and about 10 Hz, and alternatively, between about 0.1 Hz and about 5 Hz when submerged in water at a depth of from about 0 meters to about 300 meters. Marine vibrator 5 is typically referred to as a VLFS where it has at least one resonance frequency of about 10 Hz or lower.

Figure 2:
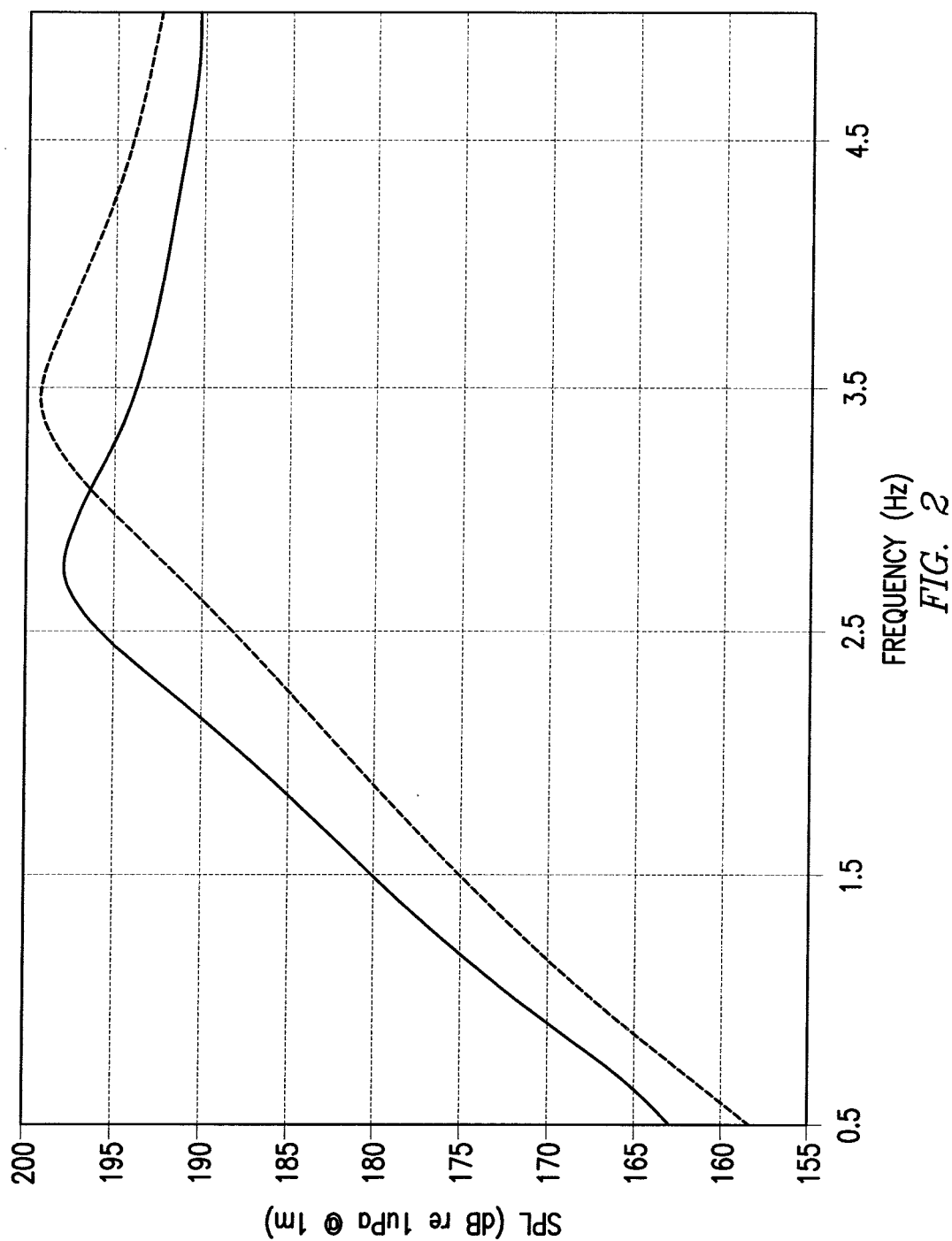
FIG. 2 illustrates a simulated amplitude spectrum showing effect of using a compliance chamber in accordance with example embodiments.

FIG. 2 illustrates the effect of an air spring on marine vibrator 5 at various depths in accordance with example embodiments. More particularly, FIG. 2 shows the results from a finite element simulation to evaluate the use of compliance chamber 15 in a marine vibrator 5 in accordance with example embodiments. The output of marine vibrator 5 with four compliance chambers 15 is shown as the solid line on FIG. 2. The output of the same marine vibrator 5 without any compliance chambers 15 is shown as the dotted line on FIG. 2. The curves represent the marine vibrator output when towed in seawater at a depth of about 50 meters. Each compliance chamber 15 had a chamber spring constant (dynamic portion only) of 1.0 E+5 Newtons per meter. The air spring in the marine vibrator internal volume had a spring constant of 2.86 E+6, calculated from the bulk modulus. As illustrated by FIG. 2, employment of compliance chambers 15 decreased the resonance frequency from 3.4 Hz to 2.7 Hz. In addition, the output at all frequencies below the resonance frequency was increased by about 4 decibels to about 5 decibels.

Figure 3:
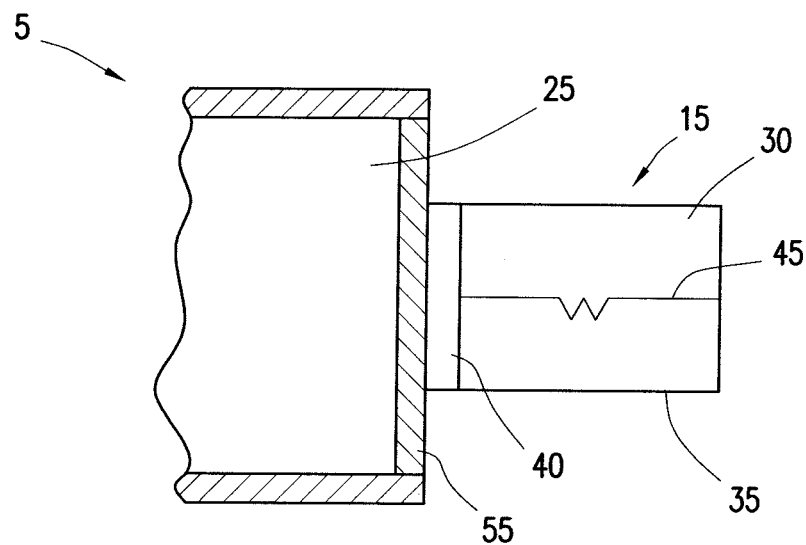
FIG. 3 illustrates an example compliance chamber externally disposed on a marine vibrator.

As discussed above, marine vibrator 5 may use a compliance chamber 15 to compensate for changes in the marine vibrator internal gas pressure. FIG. 3 illustrates an example embodiment of a compliance chamber 15 such that compliance chamber 15 may be used to compensate for changes in the marine vibrator internal gas pressure. As illustrated, marine vibrator internal volume 25 is disposed within marine vibrator 5. In the illustrated embodiment, marine vibrator internal volume 25 may contain a gas, such as air, to provide a marine vibrator internal gas pressure. Compliance chamber 15 may be in contact with marine vibrator internal volume 25. Compliance chamber 15 may have a chamber internal volume 30, which may provide a chamber internal gas pressure. In some embodiments, chamber internal volume 30 may contain a gas, such as air. As previously described, the chamber internal gas pressure may be less than the marine vibrator internal gas pressure. The chamber internal gas pressure may be less than 1 atmosphere. In accordance with present embodiments, chamber internal volume 30 may be sealed so as to not result in a chamber internal gas being in contact with any marine vibrator internal gas which may be present in marine vibrator internal volume 25.

As illustrated, compliance chamber 15 may comprise a chamber housing 35, a chamber piston 40, and a chamber spring element 45. In some embodiments, chamber internal volume 30 may be defined by chamber housing 35 and chamber piston 40. Chamber piston 40 may be slidable in chamber housing 35 such that, when driven into or out of chamber housing 35, the chamber internal volume 30 may be changed. Chamber piston 40 may be designed with sufficient displacement in chamber housing 35 to compensate for a change in marine vibrator internal gas pressure, for example due to a change in depth and/or any change in marine vibrator internal volume 25 due to the operation of marine vibrator 5. The chamber piston 40 may be sealed in chamber housing 35, for example, with an O-ring, rubber seal, or a bellows. While chamber piston 40 is shown as a disk or other cylindrical element, it should be understood that other configurations for chamber piston 40 may be used to effect a desired chamber internal volume change in chamber housing 35. For example, chamber piston 40 may have a different configuration, including square, rectangular, or oblong, among others. A spring piston may be formed by chamber piston 40 and a chamber spring element 45. Chamber piston 40 may be loaded in chamber housing 35 with chamber spring element 45. As illustrated, chamber spring element 45 may be disposed within chamber internal volume 30 to exert a biasing action on chamber piston 40. Chamber spring element 45 may be any spring suitable for exerting a biasing action on chamber piston 40, including both linear and non-linear springs. By way of example, chamber spring element 45 may be a compression spring, a torsion spring, or any other suitable spring for exerting the desired biasing action. Specific examples of springs that may be used for chamber spring element 45 include coil springs, leaf springs, and Belleville spring washers, among others. Non-linear springs (such as Belleville spring washers) may be advantageous in certain embodiments by providing a softening response as the pressure increases. Other flexible machined structures could also be used as chamber spring element 45. By way of example, chamber piston 40 and chamber spring element 45 could be replaced by a machined structure with an internal volume. Some portion of the machined structure could act as chamber spring element 45 and some portion of the machined element could act as chamber piston 40. For example, a thin, flexible plate (e.g., flexible plate 205 on FIGS. 13A and 13B) with a chamber internal gas pressure less than the marine vibrator internal gas pressure may compensate for the pressure differential across it, such that the flexible plate performs the functions of both chamber spring element 45 and chamber piston 40.

Compliance chamber 15 may be disposed on marine vibrator 5 by being coupled to containment housing 55 of marine vibrator 5. Compliance chamber 15 may be in contact with marine vibrator internal volume 25 through an opening, port, window, or the like in containment housing 55. In some embodiments, containment housing 55 may further include optional caps (not shown), which may be disposed in a lateral side of containment housing 55. In particular embodiments, one or more of these caps may be removable to expose an opening, port, window, or the like in containment housing 55. By way of example, the caps may facilitate coupling of a device, for example, compliance chamber 15, to containment housing 55 to place compliance chamber 15 in contact with the marine vibrator internal volume 25 of marine vibrator 5.

Operation of compliance chamber 15, as shown on FIG. 3, will now be described in accordance with the example embodiment. Compliance chamber 15 may operate due to a change in the pressure differential across chamber piston 40 between the marine vibrator internal volume 25 and the chamber internal volume 30. By way of example, the change in the pressure differential may be caused by an increase in the marine vibrator internal gas pressure due to increased depth and/or the acoustic operation of marine vibrator 5. In the illustrated embodiment, the resulting force due to the pressure differential may be counteracted by a force applied to chamber piston 40 by chamber spring element 45. Increasing the marine vibrator internal gas pressure within marine vibrator internal volume 25 typically results in an increased force requirement by compliance chamber 15. In embodiments where a compression spring is used for chamber spring element 45, increased force may be achieved through a displacement such that a volume change may occur within chamber internal volume 30 due to changes in the marine vibrator internal gas pressure within marine vibrator 5. The change in chamber internal volume 30 may compensate for the change in marine vibrator internal volume 25 and the increase in marine vibrator internal gas pressure. As a result, stiffness effects (i.e., the air-spring effect) on marine vibrator 5 resonance frequency may be reduced.

As discussed above, compliance chamber 15 may lower the resonance frequency of marine vibrator 5. Embodiments of compliance chamber 15 may be disposed within the interior or on the exterior of marine vibrator 5. Embodiments of compliance chamber 15 may be used in a variety of embodiments of marine vibrator 5. FIGS. 1 and 3-9 illustrate the implementation and use of compliance chamber 15 within different embodiments of marine vibrator 5.

Figure 4:
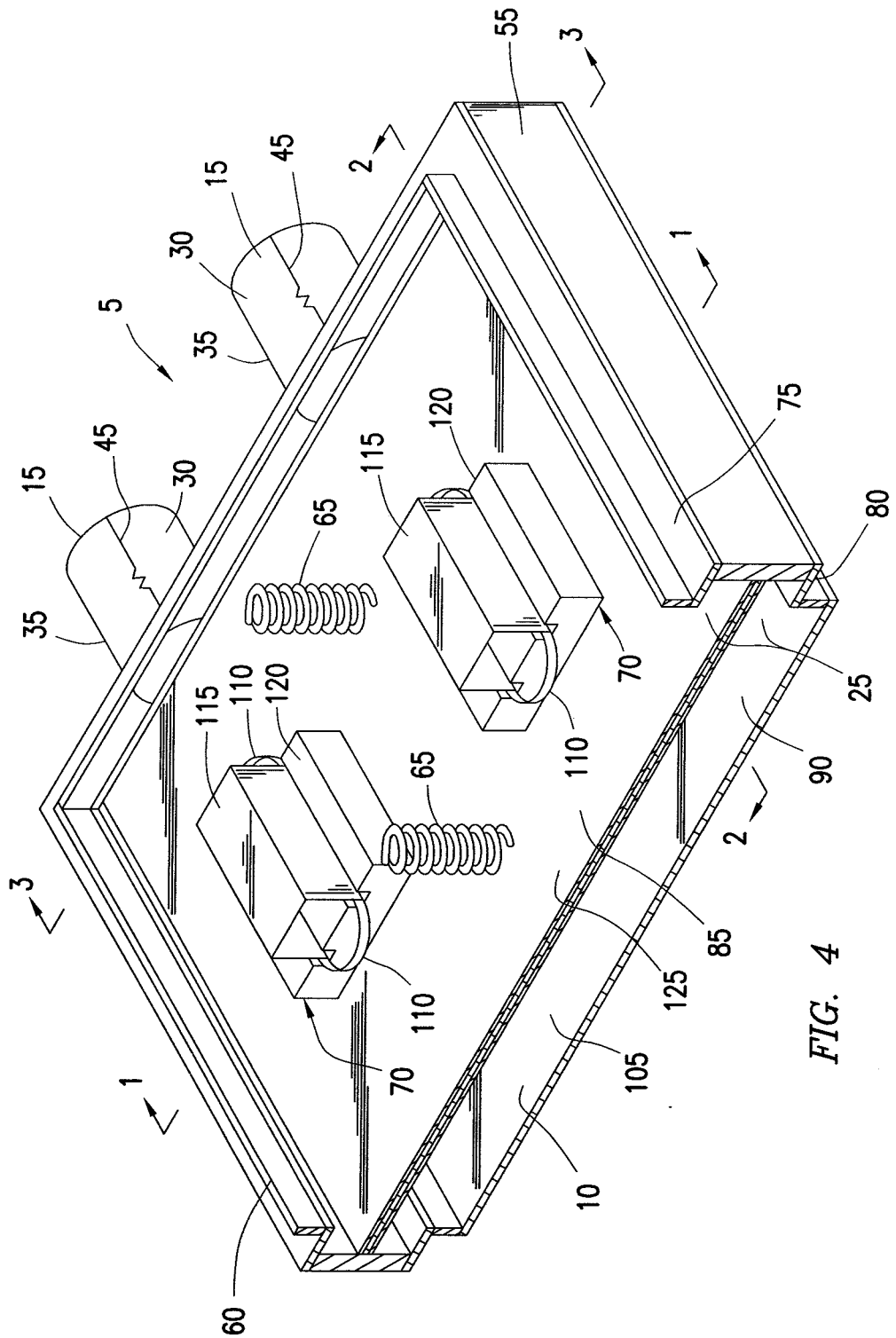
FIG. 4 illustrates a partial cross-sectional view of the marine vibrator of FIG. 1.
Figure 5:
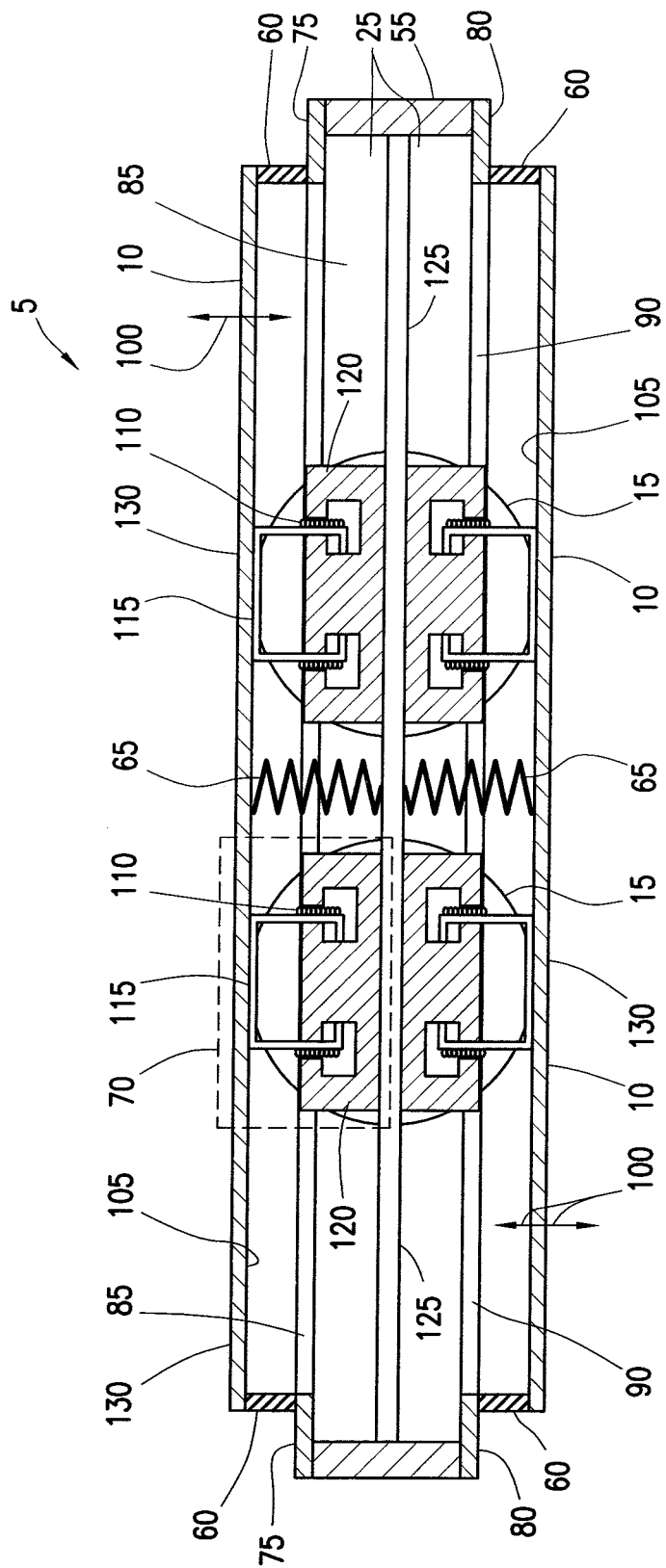
FIG. 5 illustrates a cross-sectional view of the marine vibrator of FIGS. 1 and 4 taken along line 1-1 of FIG. 4.
Figure 6:
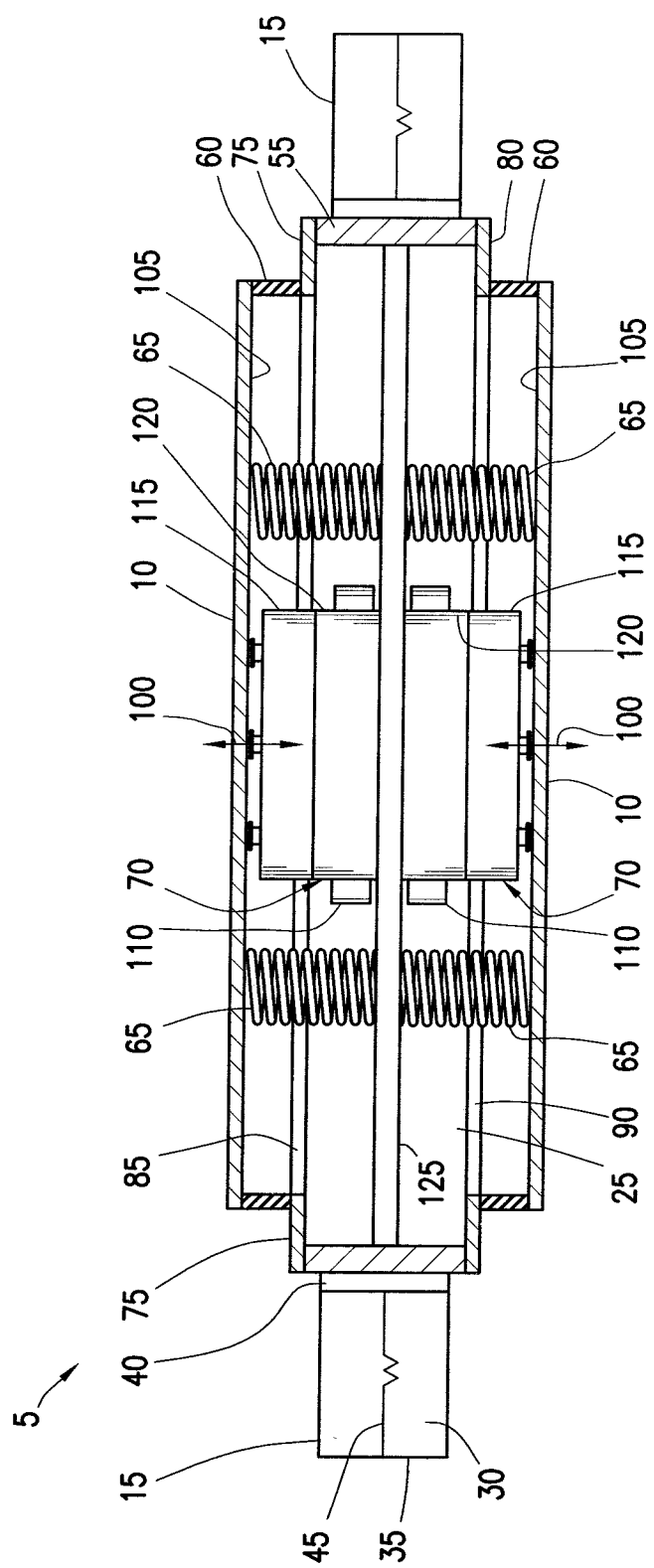
FIG. 6 illustrates a cross-sectional view of the marine vibrator of FIGS. 1 and 4 taken along line 2-2 of FIG. 4.

With reference now to FIGS. 1 and 4-6, embodiments of marine vibrator 5 are now described. FIG. 4 is a partial cross-sectional view of an embodiment of marine vibrator 5. FIG. 5 is a cross-sectional view of the embodiment of marine vibrator 5 of FIG. 4 taken along line 1-1 of FIG. 4. FIG. 6 is a cross-sectional view of the embodiment of marine vibrator 5 of FIG. 4 taken along line 2-2 of FIG. 4.

In the illustrated embodiment, marine vibrator 5 includes a containment housing 55. Piston plates 10 may be flexibly coupled to containment housing 55, for example, by way of rubber seals 60. As best seen in FIGS. 4-6, piston plates 10 may each have mechanical spring elements 65 attached to them. One or more drivers 70 may be disposed in containment housing 55 to cause the piston plates 10 to move back and forth. This motion of piston plates 10 may take advantage of the flexibility of rubber seals 60. As would be understood by one of ordinary skill in the art with the benefit of this disclosure, rubber seals 60 do not need to be made of rubber, but rather may be made from any material that allows a flexible coupling of piston plates 10 to containment housing 55 as further discussed below.

Containment housing 55 may have first surface 75 and second surface 80, which may be opposing one another. As best seen on FIGS. 4-6, first opening 85 and second opening 90 may be formed respectively in the first surface 75 and the second surface 80. While not illustrated, in some embodiments, first opening 85 and second opening 90 may be larger or smaller than piston plates 10. As discussed above, marine vibrator 5 further comprises an interior volume, marine vibrator internal volume 25, which may be at least partially defined by containment housing 55 and piston plates 10. In some embodiments, mechanical spring elements 65 and drivers 70 may be at least partially disposed within marine vibrator internal volume 25. In alternative embodiments, mechanical spring elements 65 and drivers 70 may be entirely disposed within marine vibrator internal volume 25. While not illustrated, in further alternative embodiments, mechanical spring elements 65 may be disposed outside containment housing 55 so long as mechanical spring elements 65 are coupled to fixture 125. In some embodiments, marine vibrator 5 may be pressure compensated such that the pressure within marine vibrator internal volume 25 may be kept the same as the external pressure (i.e. the pressure on the side of piston plate 10 opposite that of marine vibrator internal volume 25), thus enabling operation at greater depth, for example, up to about 300 meters or more. Containment housing 55 together with piston plates 10 and rubber seals 60 may form a waterproof housing for the other components of marine vibrator 5, such as mechanical spring elements 65 and drivers 70. Containment housing 55 may be constructed from any suitable material, including, without limitation, steel (e.g., stainless steel), aluminum, a copper alloy, glass-fiber reinforced plastic (e.g., glass-fiber reinforced epoxy), carbon fiber reinforced plastic, and combinations thereof. Similarly, containment housing 55 as best seen in FIGS. 1 and 4-6, may have the general shape of a rectangular box. It should be understood that other configurations of containment housing 55 may be suitable, including those having the general shape of a square box or other suitable shapes.

As illustrated in FIGS. 1 and 4-6, compliance chamber 15 may be disposed on the exterior of marine vibrator 5 via coupling to containment housing 55. Compliance chamber 15 may be in contact with marine vibrator internal volume 25 through a hole, opening, port, or the like in containment housing 55. As previously discussed, compliance chamber 15 may boost the lower frequency performance of marine vibrator 5. In some embodiments, compliance chamber 15 may enable marine vibrator 5 to operate within the seismic frequency range of about 1 Hz to about 10 Hz when submerged in water at a depth as deep as about 300 meters.

As best illustrated by FIG. 1, containment housing 55 may include first and second ends 57, 58 to which brackets 59 may be separately mounted. Brackets 59 may be used for hoisting marine vibrator 5, for example when deploying marine vibrator 5 in the water. By way of example, brackets 59 may facilitate attachment of marine vibrator 5 to tow lines, a survey vessel (e.g., survey vessel 225 on FIG. 16), or other suitable device or mechanism used in conjunction with towing marine vibrator 5 through a body of water.

Piston plates 10 may typically be constructed of a material that will not deform, bend or flex when in use. By way of example, piston plates 10 may comprise, without limitation, steel (e.g., stainless steel), aluminum, a copper alloy, glass-fiber reinforced plastic (e.g., glass-fiber reinforced epoxy), carbon fiber reinforced plastic, and combinations thereof. In some embodiments, piston plates 10 may be substantially flat and rectangular in shape. By way of example, piston plate 10 shown on FIG. 1 is rectangular in shape except with rounded corners. In some embodiments, piston plates 10 may be in the form of flat, circular disks. By way of example, piston plates 10 may each be a flat, circular disk having substantially uniform thickness. However, other configurations, including both axially-symmetric and not, of piston plates 10 may be suitable for particular applications. By way of example, piston plates 10 may be square, elliptical, or other suitable shape for providing the desired acoustic energy. In alternative embodiments, piston plates 10 may be curved, either convexly protruding into marine vibrator internal volume 25, or concavely expanding marine vibrator internal volume 25. In general, piston plates 10 have a thickness that provides stiffness and also withstands expected pressures. As will be appreciated by those of ordinary skill in the art with the benefit of this disclosure, the plate thickness may vary based on the material of construction, among other factors. As will be discussed in more detail below, the mass load of piston plates 10 and the spring constant of mechanical spring elements 65 may be selected (i.e. tuned) in a manner to produce a first resonance frequency within the desired seismic frequency range when marine vibrator 5 is submerged in water at a depth of from about 0 meters to about 300 meters. While a single piston plate 10 is illustrated on either side of fixture 125, embodiments may include more than one piston plate 10 on either side of fixture 125. Moreover, embodiments may include piston plates 10 that are smaller in size with respect to containment housing 55 as compared to those illustrated on FIGS. 1 and 4-6.

With continued reference to FIGS. 1 and 4-6, piston plates 10 may each be secured to containment housing 55 in a manner that allows movement of piston plates 10 relative to containment housing 55 with substantially no bending or flexing of piston plates 10. As best seen on FIGS. 5 and 6, a pair of piston plates 10 is shown. One of the piston plates 10 may be disposed on one side of containment housing 55 while the other piston plates 10 may be disposed on the opposing side of containment housing 55. As illustrated, one of the piston plates 10 may be coupled to the containment housing 55 at or near the first surface 75 and the other piston plate 10 may be coupled to the containment housing 55 at or near the second surface 80. Piston plates 10 may each cover a corresponding one of the first opening 85 or second opening 90 in the respective first surface 75 and second surface 80 of containment housing 55. In the illustrated embodiment, piston plates 10 are coupled to containment housing 55 by way of rubber seals 60. Rubber seals 60 may not hold piston plates 10 in place but rather may flex (or otherwise move) to permit movement of piston plates 10 at their outer edges. In particular embodiments, piston plates 10 may function as piston transducers, wherein each of the piston plates 10 moves back forth by actuation of the drivers 70. Movement of pistons plates 10 is illustrated in FIGS. 5 and 6 by arrows 100. In contrast to flextensional-shell type marine vibrators, piston plates 10 may not bend or flex in operation, but rather may move back and forth acting against the surrounding water.

Compliance chamber 15 may be disposed on the exterior of any part of containment housing 55. In alternative embodiments, compliance chamber 15 may be disposed on the interior of marine vibrator 5. With reference now to FIG. 3, compliance chamber 15 may comprise chamber housing 35, chamber piston 40, and chamber spring element 45. Chamber internal volume 30 may be at least partially defined by chamber piston 40 and chamber housing 35. Compliance chamber 15 may be in contact with chamber internal volume 30 and marine vibrator internal volume 25. Compliance chamber 15 may be coupled to containment housing 55 using any sufficient means, for example, a threaded connection. Compliance chamber 15 may be in contact with marine vibrator internal volume 25 through a hole, opening, port, or the like in containment housing 55.

Turning again to FIGS. 1 and 4-6, drivers 70, may be one of a variety of types of drivers 70, for example electro-dynamic drivers. In some embodiments, the drivers 70 may be "moving coil" or "voice coil" drivers, which may provide the ability to generate very large acoustic energy amplitudes. Although the particular embodiment described herein shows four uni-directional drivers utilized in parallel, embodiments in which one or more bi-directional drivers, embodiments with one or more uni-directional drivers, or embodiments in which more or less than four uni-directional drivers are utilized, are each within the scope of the invention. As best seen in FIGS. 5 and 6, a pair of drivers 70 may be coupled to an interior surface 105 of one piston plate 10, while another pair of drivers 70 may be coupled to an interior surface 105 of the other piston plate 10. Drivers 70 may also be coupled to fixture 125.

As illustrated, drivers 70 may each comprise a uni-directional, moving coil driver, comprising an electric coil 110, transmission element 115, and magnetic circuitry 120, which work together to generate a magnetic field. As illustrated, magnetic circuitry 120 may be connected to fixture 125, while transmission element 115 may connect to the corresponding piston plate 10. In some embodiments (not illustrated), this arrangement may be reversed (i.e., magnetic circuitry 120 connects to the corresponding piston plate 10, while transmission element 115 connects to fixture 125). As illustrated, each transmission element 115 may transfer the motion of the corresponding electric coil 110 to interior surface 105 of the corresponding piston plate 10. When electrical current I is applied to electric coil 110, a force F acting on electric coil 110 may be generated as follows:

$$F = IlB \qquad \text{(Eq. 1)}$$

Where I is the current, l is the length of the conductor in electric coil 110, and B is the magnetic flux generated by magnetic circuitry 120. By varying the magnitude of the electrical current and consequently the magnitude of the force acting on electric coil 110, the length of the driver stroke may vary. Each driver 70 may provide stroke lengths of several inches—up to and including about 10″—which may allow the marine vibrator 5 to generate enhanced amplitude acoustic energy output in the low frequency ranges, for example, between about 1 Hz and about 10 Hz when marine vibrator 5 is submerged in water at a depth of from about 0 meters to about 300 meters. Magnetic circuitry 120 may comprise permanent magnets, though any device capable of generating a magnetic flux may be incorporated.

In the illustrated embodiment, mechanical spring elements 65 (e.g., in the form of coil springs) are disposed in containment housing 55 on either side of fixture 125. As best seen in FIGS. 4 and 5, pairs of mechanical spring elements 65 may be located in either side of fixture 125, with a first pair of mechanical spring elements 65 disposed on one side of fixture 125, and a second pair of mechanical spring elements 65 may be disposed on the opposing side of fixture 125. Mechanical spring elements 65 in the first pair may be disposed on opposite sides of the drivers 70 from one another, and mechanical spring elements 65 in the second pair may also be disposed on opposite sides of the drivers 70 from one another. Mechanical spring elements 65 may each extend between a corresponding one of piston plates 10 and fixture 125. Mechanical spring elements 65 may be coupled to fixture 125 and at least one of piston plates 10 to exert a biasing action against piston plates 10. A wide variety of different mechanical spring elements 65 may be used that are suitable for exerting the desired biasing action against piston plates 10, including both linear and non-linear springs. In particular embodiments, mechanical spring elements 65 may be any of a variety of different types of springs, including compression springs, torsion springs, or other suitable springs for exerting the desired biasing action. Specific examples of mechanical spring elements 65 that may be used include coil springs, flat springs, bow springs, and leaf springs, among others. Suitable mechanical spring elements 65 may be constructed from spring steel or other suitable resilient material, such as glass-fiber reinforced plastic (e.g., glass-fiber reinforced epoxy), carbon fiber reinforced plastic, and combinations thereof. In some embodiments, the dimensions, material make-up, and the shape of mechanical spring elements 65 may be selected to provide a sufficient spring constant for vibrations in the seismic frequency range of interest when the marine vibrator 5 is submerged in water at a depth of from about 0 meters to about 300 meters.

In some embodiments, a fixture 125 suspends drivers 70 within containment housing 55. For example, in the illustrated embodiment, fixture 125 extends along the major axis of containment housing 55 and may be coupled to either end of containment housing 55. Fixture 125 may be circular, square, rectangular, or other suitable cross-section as desired for a particular application. An example of a suitable fixture 125 may include a rod, beam, plate, or other suitable frame for supporting internal components such as drivers 70 in containment housing 55. In particular embodiments, fixture 125 should be fixed to containment housing 55 in a manner that restricts movement and therefore prevents undesired contraction of the major axis of containment housing 55. In particular embodiments, piston plates 10 may work in symmetry above and below fixture 125. In other words, in some embodiments, fixture 125 may divide marine vibrator 5 into symmetrical halves with respect to at least the piston plates 10, mechanical spring elements 65, and drivers 70.

In the illustrated embodiment, coupling of rubber seals 60 to piston plates 10 is shown. Rubber seals 60 may also be coupled to containment housing 55, for example, to form a water-tight seal between piston plates 10 and containment housing 55. In general, rubber seals 60 may be configured to allow movement of piston plates 10 while also maintaining the appropriate seal. Rubber seals 60 may have significant curvature to permit significant amplitude of movement. By way of example, this permitted movement may further enable piston plates 10 to have several inches of travel, e.g., piston plates 10 may move back and forth relative to containment housing 55 a distance of from about 1 inch to about 10 inches (or more). Other techniques for permitting movement may be used, including the use of seals with bellows or accordion-type configurations.

Figure 7:
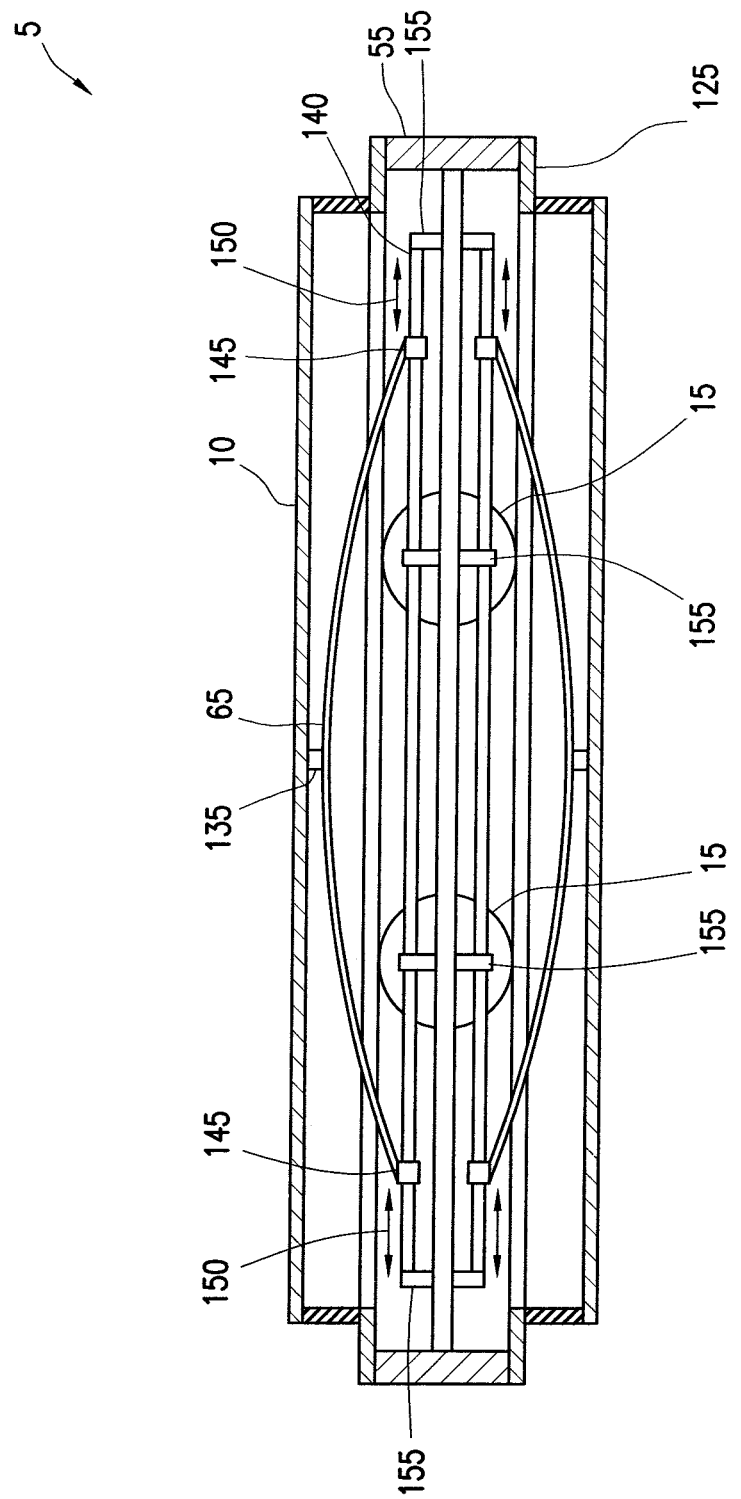
FIG. 7 illustrates a cross-sectional view of an embodiment of a marine vibrator with an alternative embodiment of a mechanical spring element taken along line 3-3 of FIG. 4.

FIG. 7 illustrates a cross-sectional view of one embodiment of marine vibrator 5 that comprises an alternative embodiment of mechanical spring element 65. This cross-sectional view is taken along line 3-3 of FIG. 4. In contrast to the mechanical spring elements of FIGS. 4-6 which are illustrated as coiled springs, FIG. 7 illustrates mechanical spring elements 65 in the form of a bow spring. In this cross-sectional view of FIG. 7, certain elements of marine vibrator 5, such as the drivers 70, are not visible.

The following description is for one of mechanical spring elements 65; however, because fixture 125 provides a line of symmetry, this description is equally applicable to both of mechanical spring elements 65. As illustrated in FIG. 7, one of mechanical spring elements 65 may be coupled to one of piston plates 10 and fixture 125. Mechanical spring element 65 may be coupled to piston plate 10 at attachment point 135, which may be a fixed connection, for example, that does not permit movement. Mechanical spring element 65 may be coupled to supplemental fixture 140, which may be in the form of a beam, rod, or other suitable frame for supporting mechanical spring element 65 in containment housing 55. Mechanical spring element 65 may be coupled to supplemental fixture 140 by way of bearings 145. In particular embodiments, bearings 145 may be linear bearings that permit linear movement of the ends of mechanical spring element 65 as represented by arrows 150. In this manner, mechanical spring element 65 may be allowed to flex and provide a biasing force to piston plate 10 upon its movement. Supplemental fixture 140 may be coupled to fixture 125 at one or more of fixture attachment points 155, which may be fixed connections that do not permit movement. As seen in the perspective of FIG. 7, compliance chamber 15 is disposed on the exterior of marine vibrator 5, coupled to the section of containment housing 55 that is located behind mechanical spring element 65. Compliance chamber 15 may enable marine vibrator 5 to operate within the seismic frequency range of about 1 Hz to about 10 Hz when submerged in water at a depth as deep as about 300 meters.

Figure 8:
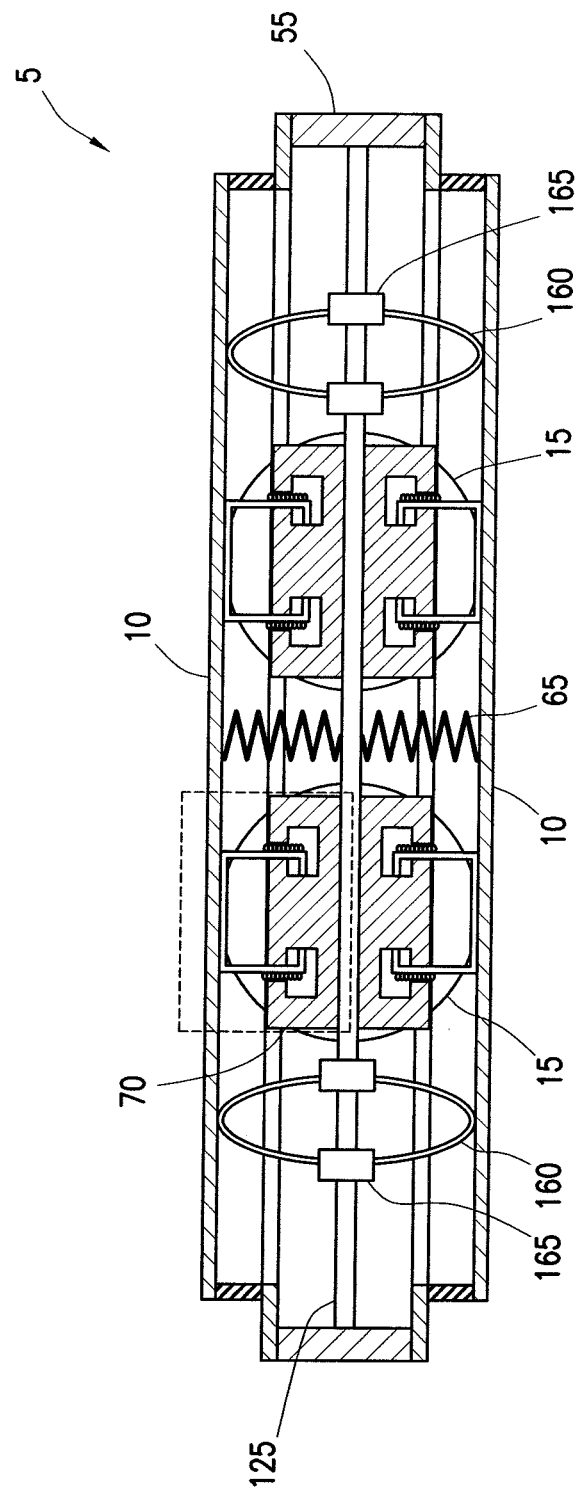
FIG. 8 illustrates a cross-sectional view of an alternative embodiment of the marine vibrator of FIGS. 1 and 4 that further comprises mass spring elements and is taken along line 1-1 of FIG. 4.

Turning now to FIG. 8, marine vibrator 5 is illustrated as further comprising two mass spring elements 160 with weights 165 affixed thereto. Mass springs elements 160 shown on FIG. 8 may also be used in conjunction with the mechanical spring elements 65 shown on FIG. 7 (or other suitable type of mechanical spring element 65). As illustrated, mass spring elements 160 may be generally elliptically shaped. As illustrated, mass spring elements 160 may be coupled to fixture 125 and piston plates 10. In the illustrated embodiment, a pair of mass spring elements 160 are shown on either side of fixture 125 so that marine vibrator 5 comprises four mass spring elements 160. However, it should be understood that more or less than four mass spring elements 160 may be utilized for a particular application. As will be described below, in various embodiments, the spring constant of mass spring elements 160 and the mass of weights 165 may be selected in a manner to achieve a second system resonance frequency within the seismic frequency range of interest when marine vibrator 5 is submerged in water at a depth of from about 0 meters to about 300 meters. In a particular embodiment, marine vibrator 5 may exhibit a first resonance frequency of about 2.5 Hz and a second resonance frequency of about 4.5 Hz when submerged in water at a depth of from about 0 meters to about 300 meters. Although a marine vibrator 5 that does not include mass spring elements 160, as shown in the embodiment illustrated in FIGS. 4-6, may display a second resonance frequency, the second resonance frequency would typically be much higher and thus outside the seismic frequency range of interest. As seen in FIG. 8, compliance chamber 15 is disposed on the exterior of marine vibrator 5, coupled to the section of containment housing 55 that is located behind mechanical spring element 65. Compliance chamber 15 may enable marine vibrator 5 to operate within the seismic frequency range of about 1 Hz to about 10 Hz when submerged in water at a depth as deep as about 300 meters.

In some embodiments, marine vibrator 5 may display at least one resonance frequency (when submerged in water at a depth of from about 0 meters to about 300 meters) between about 1 Hz to about 200 Hz. In alternative embodiments, marine vibrator 5 may display at least one resonance frequency (when submerged in water at a depth of from about 0 meters to about 300 meters) between about 0.1 Hz and about 100 Hz, alternatively, between about 0.1 Hz and about 10 Hz, and alternatively, between about 0.1 Hz and about 5 Hz. In some embodiment, marine vibrator 5 may display at least two resonance frequencies of about 10 Hz or lower. The first resonance frequency may result substantially from interaction of piston plates 10 and mechanical spring elements 65. The second resonance frequency may result substantially from the interaction of mass spring elements 160 with weights 165 added thereto.

Figure 9:
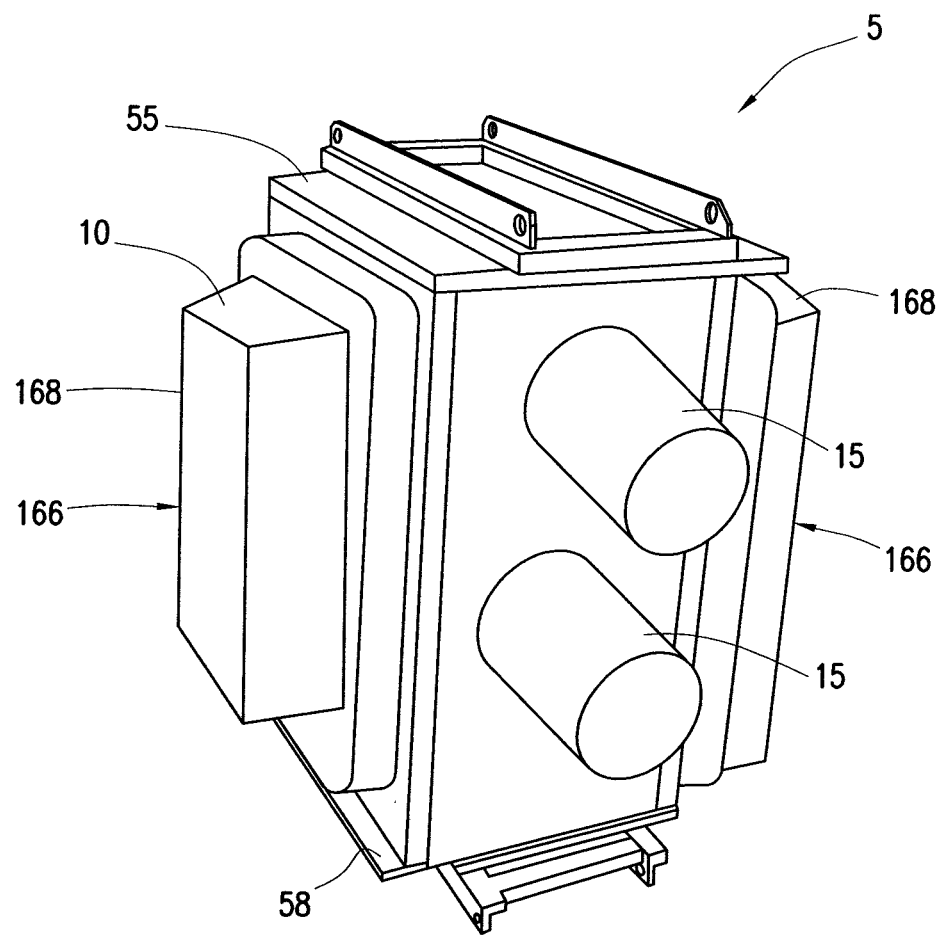
FIG. 9 illustrates another example embodiment of the marine vibrator of FIGS. 1 and 4 with a variable mass load in cross-section.

FIG. 9 illustrates an embodiment of a marine vibrator 5 that further comprises a variable mass load 166 added thereto. Marine vibrator 5 illustrated on any of FIGS. 1 and 4-8 may be implemented with compliance chamber 15 and also with the addition of variable mass load 166. Variable mass load 166 may be added to outer piston plate 10 of marine vibrator 5 to shift the resonance frequency lower. In some embodiments, variable mass load 166 may increase in mass with increasing depth of marine vibrator 5 in water. In particular embodiments, variable mass load 166 may be implemented into marine vibrator 5 via a container 168 disposed on outer piston plate 10 of marine vibrator 5. Container 168 may be configured to fill with water as marine vibrator 5 is lowered into water. In certain embodiments, variable mass load 166 may be added outside of outer piston plate 10. Variable mass load 166 may be appropriately sized to compensate for the entire frequency change due to increased depth resulting in the same resonance frequency independent of water depth.

As discussed above, compliance chamber 15 may be disposed within the interior or on the exterior of marine vibrator 5. FIGS. 10 and 12-15 illustrate different embodiments of compliance chamber 15 for use in embodiments of marine vibrator 5. Although many different embodiments of compliance chamber 15 are illustrated below, it is to be understood that any embodiment of compliance chamber 15 may be used with any embodiment of marine vibrator 5. Moreover, any embodiment of compliance chamber 15 may be substituted for another embodiment of compliance chamber 15 without limitation.

Figure 10:
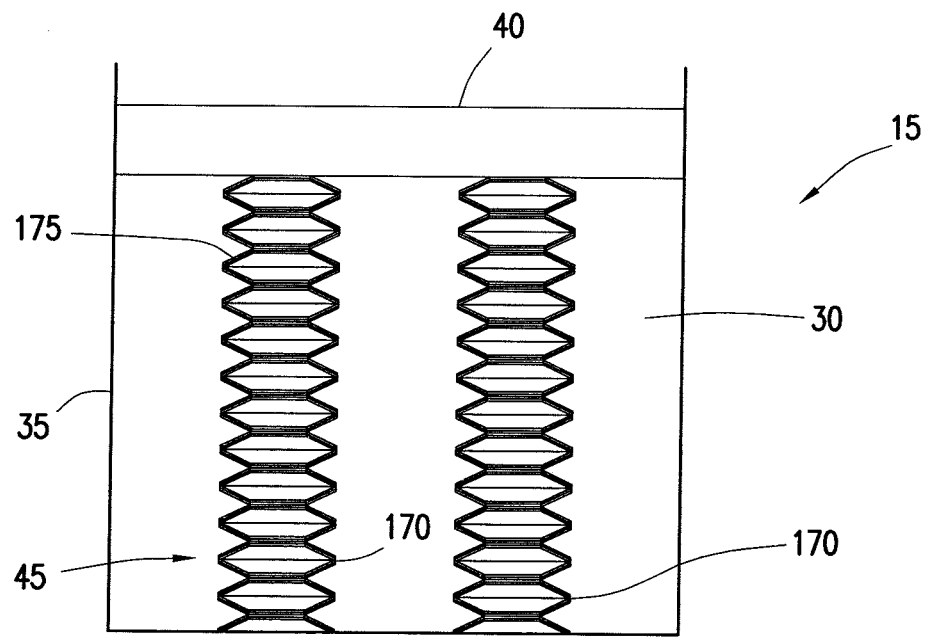
FIG. 10 illustrates employment of multiple spring stacks in a compliance chamber in accordance with example embodiments.

FIG. 10 illustrates an example compliance chamber 15 that employs multiple spring stacks 170. As illustrated, chamber spring element 45 may comprise two or more spring stacks 170. Spring stacks 170 may be disposed in chamber internal volume 30. As previously described, embodiments may comprise chamber spring element 45 exerting a biasing action on chamber piston 40, which is slidable in chamber housing 35.

In the illustrated embodiment, spring stack 170 comprises a stack of Belleville spring washers 175. Examples of suitable Belleville spring washers may include the AM Series Belleville springs available from Rolex Springs, Baltimore, Md., such as the Rolex Spring AM-25012770. A chamber spring element 45 may include one or more spring stacks 170. Those of ordinary skill in the art will appreciate that multiple Belleville spring washers 175 may be stacked to modify the spring constant. Stacking in the same direction will add the spring constant in parallel to create a stiffer spring. Stacking in an alternating direction is similar to adding springs in series and may create a lower spring constant with more deflection. Stacking multiple Belleville spring washers 175 in alternating directions and different configurations may allow design of a chamber spring element 45 with a specific spring constant.

In the illustrated embodiment, spring stack 170 comprises multiple Belleville spring washers 175 arranged in a series stack. As illustrated, adjacent pairs of Belleville spring washers 175 are arranged in parallel so that spring stack 170 comprises multiple pairs of Belleville spring washers 175 in an arranged series. It should be understood that the number and configuration of Belleville spring washers 175 may be varied to provide a selected spring constant for spring stack 170. In one particular embodiment, each Belleville spring washer 175 has an outer diameter of 245 millimeters and a mass of 2 kilograms. More than one spring stack 170 may be used in accordance with example embodiments.

Figure 11:
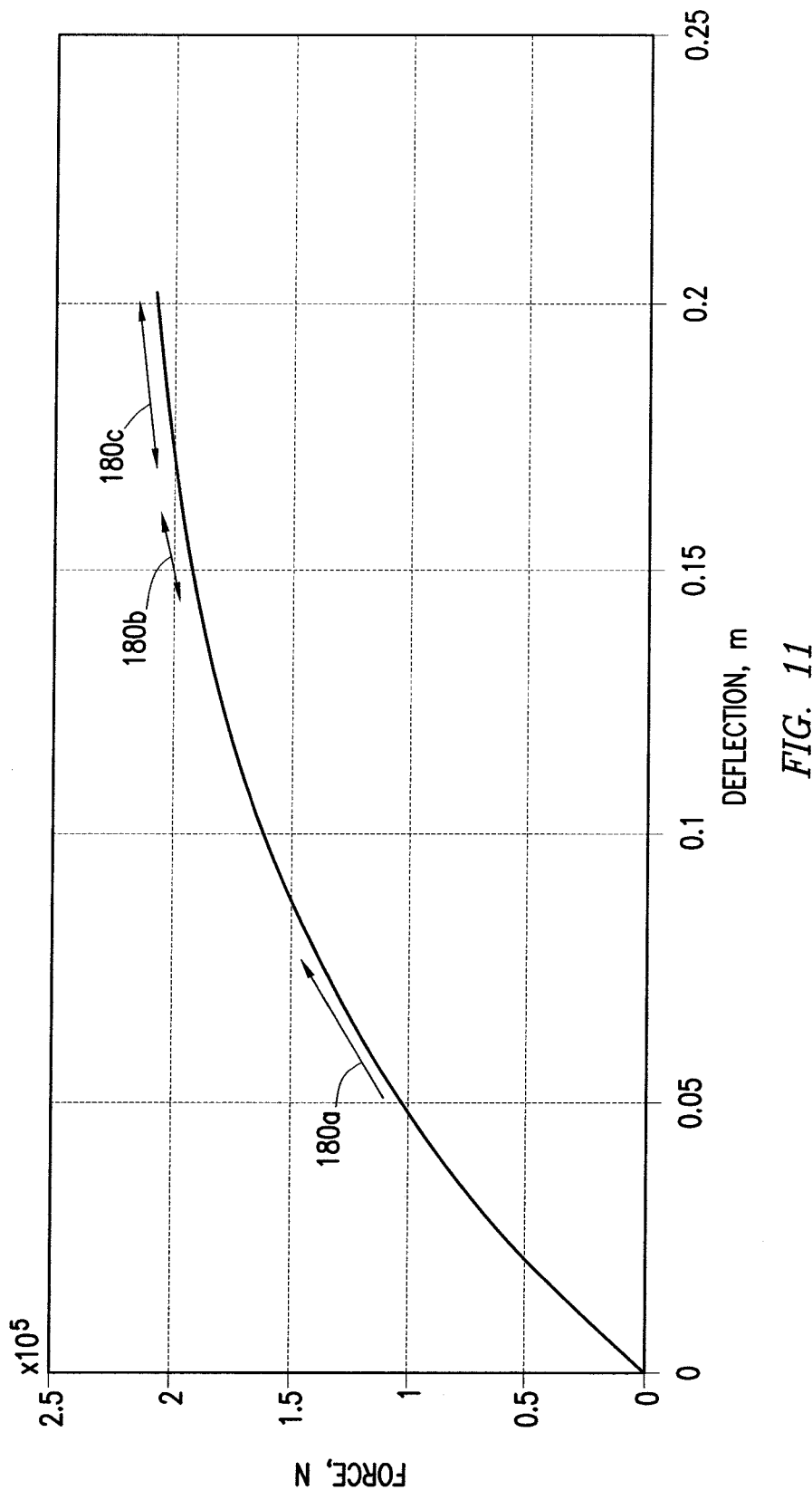
FIG. 11 is a diagram of a simulated force-deflection chart for a stack of Belleville spring washers in accordance with example embodiments.

FIG. 11 is a diagram of a force-deflection curve for spring stacks 170 shown on FIG. 10. The force-deflection curve models the response of two spring stacks 170 to forces encountered when employed in a compliance chamber 15 in example embodiments. The initial compression of spring stacks 170 during descent of marine vibrator 5 from a depth of 0 meters to about 50 meters is depicted by arrow 180*a*. The compression of spring stacks 170 during operation of marine vibrator 5 at a depth of about 50 meters is depicted by arrow 180*b*. The spring stacks 170 have a safety margin as depicted by arrow 180*c*. As illustrated by FIG. 11, spring stacks 170 may be advantageous in some embodiments due to their softening response as the force increases. Among other advantages, this may reduce the air-spring effect of compliance chamber 15 resulting in improved acoustic performance for marine vibrator 5.

Figure 12:
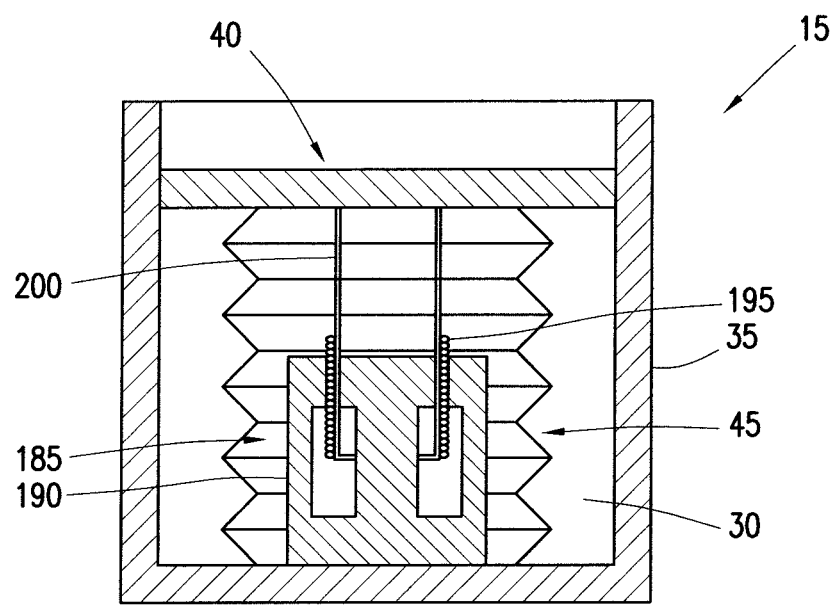
FIG. 12 illustrates an example embodiment of a compliance chamber that may be actively controlled in accordance with example embodiments.

FIG. 12 illustrates an example embodiment of compliance chamber 15 wherein the air spring may be actively controlled. In the illustrated embodiment, compliance chamber 15 is similar in structure to the embodiment of compliance chamber 15 that was illustrated in FIG. 10 but with a chamber driver 185. As shown, chamber driver 185 may be disposed in chamber internal volume 30 formed by chamber housing 35. The chamber driver 185 may be operable to change the chamber internal volume 30. In the illustrated embodiment, chamber driver 185 is an electrodynamic driver having chamber magnetic circuitry 190 and chamber coil 195. In other embodiments, chamber driver 185 may be implemented differently, for example, in one embodiment; chamber driver 185 may an electro-mechanical driver. Chamber driver 185 may be connected to chamber piston 40, for example, by chamber transmission element 200. Chamber transmission element 200 may transmit the motion of chamber coil 195 to the chamber piston 40 to cause chamber piston 40 to move in chamber housing 35, said movement may increase or decrease the chamber internal volume 30.

Figures 13A, 13B:
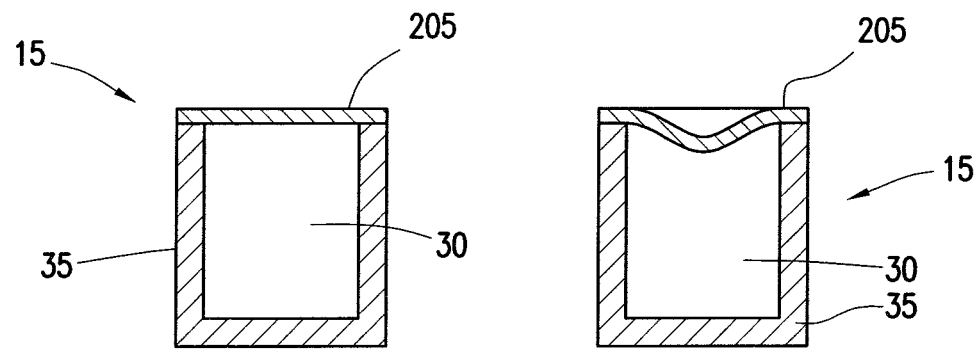
FIGS. 13A and 13B illustrate another example embodiment of a compliance chamber.

FIGS. 13A and 13B illustrate another embodiment of compliance chamber 15. In the illustrated embodiment, compliance chamber 15 is similar in structure to the embodiment of compliance chamber 15 illustrated in FIG. 10 but with a flexible plate 205 rather than chamber piston 40 and chamber spring elements 45. In the illustrated embodiment, compliance chamber 15 has a chamber internal volume 30 which may provide a chamber internal gas volume having a chamber internal gas pressure less than the marine vibrator internal gas pressure. As illustrated, compliance chamber 15 may comprise a flexible plate 205 having chamber internal volume 30 behind it. The flexible plate 205 may be disposed across the opening of chamber housing 35 or other suitable container. The flexible plate 205 and a container (such as chamber housing 35) may at least partially define chamber internal volume 30 containing the chamber internal gas. In response to changes in the marine vibrator internal gas pressure, the flexible plate 205 may flex, as best seen in FIG. 13B, such that the air spring formed by the chamber internal gas pressure applies a biasing force to flexible plate 205. Accordingly, application of a pressure differential across flexible plate 205 should result in a change in chamber internal volume 30.

Figure 14:
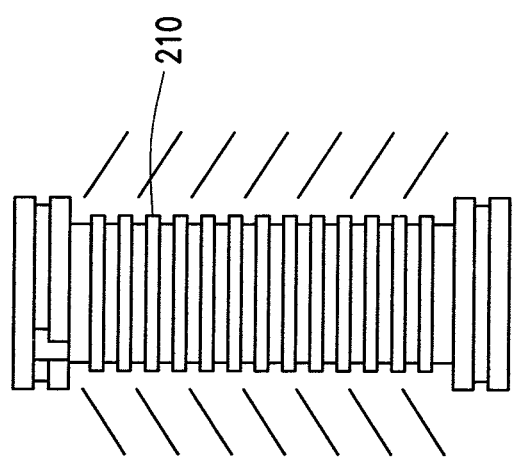
FIG. 14 illustrates another example embodiment of a compliance chamber.

FIG. 14 illustrates another example embodiment of a compliance chamber 15. In the illustrated embodiment, compliance chamber 15 comprises a flexible mechanical structure, such as flexible bellows 210, having an internal gas pressure less than the marine vibrator internal gas pressure. The flexible bellows 210 may define chamber internal volume 30 containing the chamber internal gas. The combination of flexible bellows 210 and the chamber internal gas may be more compliant than the marine vibrator internal gas such that the application of a pressure differential across flexible bellows 210 may result in a change in the chamber internal volume 30.

Figure 15:
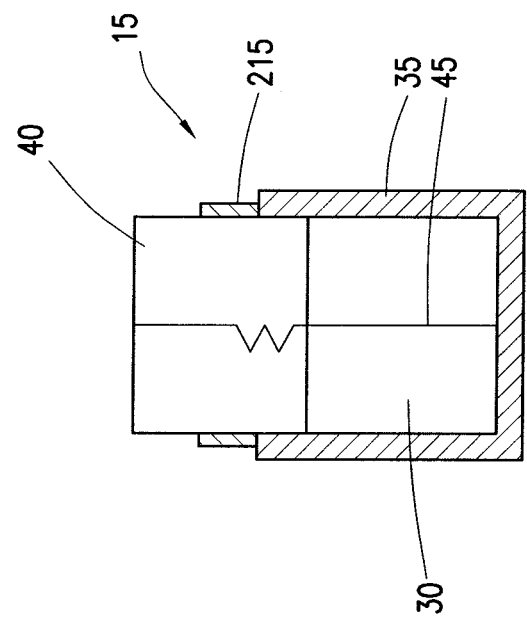
FIG. 15 illustrates another example embodiment of a compliance chamber.

FIG. 15 illustrates another example embodiment of a compliance chamber 15. As illustrated, the compliance chamber 15 may comprise chamber seals 215. As illustrated, chamber seals 215 may seal any space disposed between the chamber housing 35 and the chamber piston 40 which is slidable in chamber housing 35. Chamber seals 215 may prevent the chamber internal volume 30 from being in contact with marine vibrator internal volume 25, and consequently also prevent any chamber internal gas from being in contact with any marine vibrator internal gas.

Figure 16:
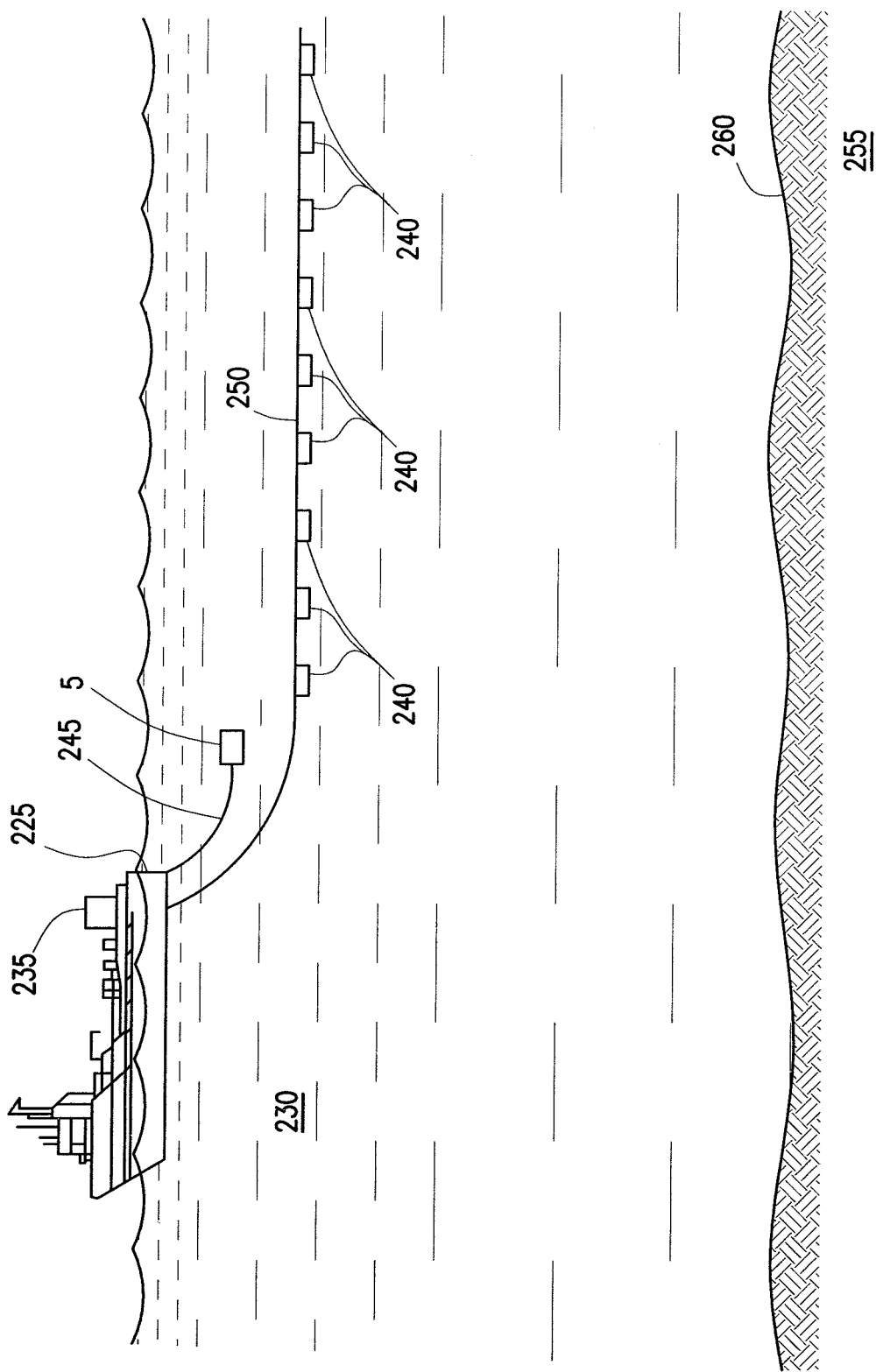
FIG. 16 is an example embodiment of a marine seismic survey system using a marine vibrator.

FIG. 16 illustrates an example technique for acquiring geophysical data that may be used with embodiments of the present techniques. In the illustrated embodiment, a survey vessel 225 moves along the surface of a body of water 230, such as a lake or ocean. The survey vessel 225 may include thereon equipment, shown generally at 235 and collectively referred to herein as a "recording system." The recording system 235 may include devices (none shown separately) for detecting and making a time indexed record of signals generated by each of seismic sensors 240 (explained further below) and for actuating a marine vibrator 5 at selected times. The recording system 235 may also include devices (none shown separately) for determining the geodetic position of the survey vessel 225 and the various seismic sensors 240.

As illustrated, survey vessel 225 (or a different vessel) may tow marine vibrator 5 in body of water 230. Source cable 245 may couple marine vibrator 5 to survey vessel 225. Marine vibrator 5 may be towed in body of water 230 at a depth ranging from 0 meters to about 300 meters, for example. While only a single marine vibrator 5 is shown in FIG. 16, it is contemplated that embodiments may include more than one marine vibrator 5 (or other type of sound source) towed by survey vessel 225 or a different vessel. In some embodiments, one or more arrays of marine vibrators 5 may be used. At selected times, marine vibrator 5 may be triggered, for example, by recording system 235, to generate acoustic energy. Survey vessel 225 (or a different vessel) may further tow at least one sensor streamer 250 to detect the acoustic energy that originated from marine vibrator 5 after it has interacted, for example, with rock formations 255 below water bottom 260. As illustrated, both marine vibrator 5 and sensor streamer 250 may be towed above water bottom 260. Sensor streamer 250 may contain seismic sensors 240 thereon at spaced apart locations. In some embodiments, more than one sensor streamer 250 may be towed by survey vessel 225, which may be spaced apart laterally, vertically, or both laterally and vertically. While not shown, some marine seismic surveys locate the seismic sensors 240 on ocean bottom cables or nodes in addition to, or instead of, a sensor streamer 250. Seismic sensors 240 may be any type of seismic sensors known in the art, including hydrophones, geophones, particle velocity sensors, particle displacement sensors, particle acceleration sensors, or pressure gradient sensors, for example. By way of example, seismic sensors 240 may generate response signals, such as electrical or optical signals, in response to detected acoustic energy. Signals generated by seismic sensors 240 may be communicated to recording system 235. The detected energy may be used to infer certain properties of the subsurface rock, such as structure, mineral composition and fluid content, thereby providing information useful in the recovery of hydrocarbons.

In accordance with an embodiment of the invention, a geophysical data product may be produced. The geophysical data product may include geophysical data that is obtained by a process that includes detecting the acoustic energy originating from marine vibrator 5. The geophysical data product may be stored on a non-transitory, tangible computer-readable medium. The geophysical data product may be produced offshore (i.e. by equipment on a vessel) or onshore (i.e. at a facility on land) either within the United States or in another country. If the geophysical data product is produced offshore or in another country, it may be imported onshore to a facility in the United States. Once onshore in the United States, geophysical analysis, including further data processing, may be performed on the data product.

The foregoing figures and discussion are not intended to include all features of the present techniques to accommodate a buyer or seller, or to describe the system, nor is such figures and discussion limiting but exemplary and in the spirit of the present techniques.

What is claimed is:

1. A marine vibrator comprising:
   a containment housing;
   a piston plate, wherein an internal volume of the marine vibrator is at least partially defined by the containment housing and the piston plate, the internal volume containing a first gas at a first gas pressure;
   a fixture coupled to the containment housing;

a mechanical spring element coupled to the piston plate and the fixture;

a driver coupled to the piston plate and the fixture; and a compliance chamber in contact with the first gas, wherein the compliance chamber comprises a second gas at a second gas pressure, wherein the second gas pressure is less than 1 atmosphere at water surface.

2. The marine vibrator of claim 1, wherein the marine vibrator has at least one resonance frequency of about 10 Hz or lower when submerged in water at a depth of from about 0 meters to about 300 meters.

3. The marine vibrator of claim 1, wherein the driver is a moving coil driver.

4. The marine vibrator of claim 1, wherein the compliance chamber comprises a chamber housing, a chamber piston slidable in the chamber housing, and a chamber spring element.

5. The marine vibrator of claim 4, wherein the compliance chamber further comprises a seal for sealing space disposed between the chamber housing and the chamber spring element.

6. The marine vibrator of claim 4, wherein the chamber spring element comprises a spring stack of Belleville spring washers.

7. The marine vibrator of claim 1, wherein the compliance chamber comprises a chamber driver operable to change an internal volume of the compliance chamber.

8. The marine vibrator of claim 1, wherein the compliance chamber comprises a flexible plate and a chamber housing that define a sealed internal volume that contains the second gas.

9. The marine vibrator of claim 1, wherein the compliance chamber comprises a flexible bellows that defines a sealed internal volume that contains the second gas.

10. The marine vibrator of claim 1, wherein the compliance chamber is disposed on the exterior of the marine vibrator.

11. The marine vibrator of claim 1, wherein the mechanical spring element comprises at least one type of spring selected from the group consisting of: a bow spring, a coil spring, a flat spring, and a leaf spring.

12. The marine vibrator of claim 1, further comprising a second mechanical spring element disposed on an opposite side of the driver from the mechanical spring element.

13. The marine vibrator of claim 1, wherein the piston plate is coupled to the containment housing by way of a rubber seal.

14. The marine vibrator of claim 1, wherein the marine vibrator further comprises a mass spring element having weights affixed thereto, the mass spring element being coupled to the fixture and the piston plate.

15. A marine vibrator comprising:

a containment housing;

a piston plate, wherein an internal volume of the marine vibrator is at least partially defined by the containment housing and the piston plate, the internal volume containing a first gas at a first gas pressure;

a fixture coupled to the containment housing;

a mechanical spring element coupled to the piston plate and the fixture;

a driver coupled to the piston plate and the fixture;

a compliance chamber in contact with the first gas, wherein the compliance chamber comprises a second gas at a second gas pressure; and a container coupled to an exterior surface of the piston plate, wherein the container is configured to hold a variable mass load.

16. A method comprising:

towing a marine vibrator, wherein the marine vibrator comprises:

a containment housing;

a piston plate, wherein an internal volume of the marine vibrator is at least partially defined by the containment housing and the piston plate, the internal volume containing a first gas at a first gas pressure;

a fixture coupled to the containment housing;

a mechanical spring element coupled to the piston plate and the fixture;

a driver coupled to the piston plate and the fixture; and a compliance chamber in contact with the first gas, wherein the compliance chamber comprises a second gas at a second gas pressure, wherein the second gas pressure is less than 1 atmosphere at water surface;

triggering the marine vibrator to cause the piston plate in the marine vibrator to move back and forth wherein the mechanical spring element exerts a biasing force against the piston plate; and varying an internal volume of the compliance chamber in response to changes in an internal gas pressure of the marine vibrator to adjust a resonance frequency of the marine vibrator.

17. The method of claim 16, wherein the varying the internal volume of the compliance chamber comprises moving a chamber piston in a chamber housing, wherein the compliance chamber comprises the chamber piston and the chamber housing.

18. The method of claim 17, further comprising operating a chamber driver to cause the chamber piston to move in the chamber housing.

19. The method of claim 16, wherein the varying the internal volume of the compliance chamber further comprises moving a flexible plate of the compliance chamber.

20. The method of claim 16, wherein the varying the internal volume of the compliance chamber further comprises moving a flexible bellows of the compliance chamber.

21. The method of claim 16, wherein the marine vibrator generates a first resonance frequency within a frequency range of about 1 Hz and about 10 Hz when submerged in a body of water at a depth of from about 0 meters to about 300 meters.

22. The method of claim 16, further comprising:

obtaining geophysical data; and processing the geophysical data to generate a geophysical data product, wherein the geophysical data product is obtained by a process that includes detecting acoustic energy originating from the marine vibrator.

23. The method of claim 22, further comprising recording the geophysical data product on a tangible, non-volatile computer-readable medium suitable for importing onshore.

24. The method of claim 23, further comprising performing geophysical analysis onshore on the geophysical data product.

25. The method of claim 16, further comprising towing the marine vibrator in a body of water in conjunction with a geophysical survey.

* * * * *